C. J. ROY.
TRAP.
APPLICATION FILED FEB. 12, 1918.
1,271,372. Patented July 2, 1918.
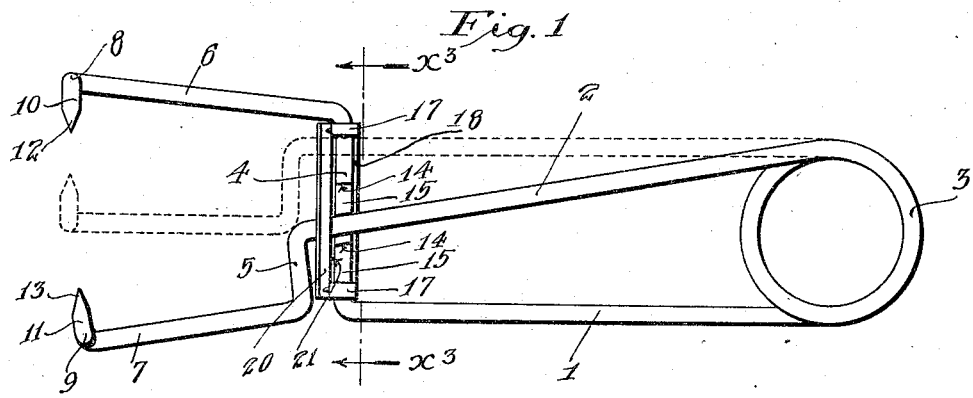
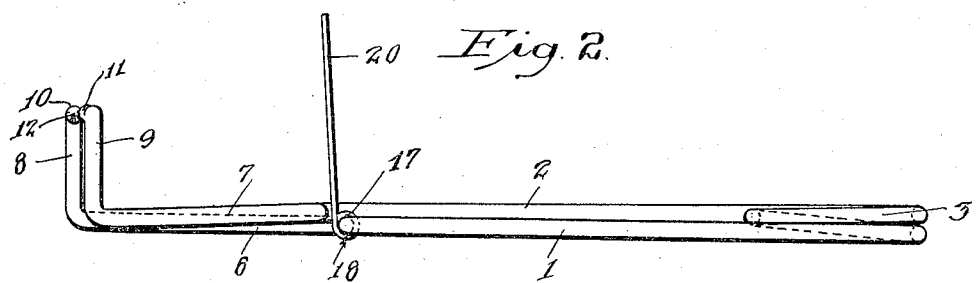
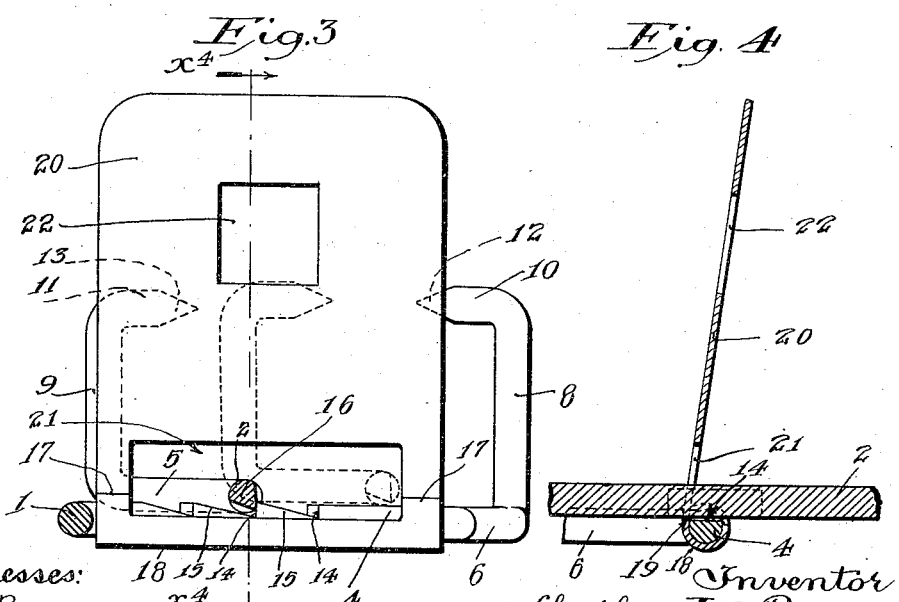
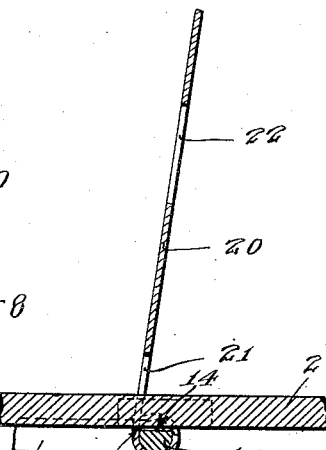
Witnesses:
Inventor
Charles J. Roy
By Frederick Whyper Atty.

UNITED STATES PATENT OFFICE.

CHARLES J. ROY, OF SANTA MONICA, CALIFORNIA.

TRAP.

1,271,372.  Specification of Letters Patent.  Patented July 2, 1918.

Application filed February 12, 1918. Serial No. 216,683.

*To all whom it may concern:*

Be it known that I, CHARLES J. ROY, a citizen of the United States, residing at Santa Monica, in the county of Los Angeles and State of California, have invented a new and useful Trap, of which the following is a specification.

An object of this invention is to provide a trap for catching rodents and the like.

Another object is to produce a trap of this character of comparatively simple construction and one that is relatively cheap to manufacture.

Other objects and advantages will appear in the subjoined detail description.

The accompanying drawings illustrate the invention:

Figure 1 is a plan view of a trap embodying the invention, the trap being shown in "set" position in solid lines and one of the arms being shown in "sprung" position in dotted lines.

Fig. 2 is a side elevation of Fig. 1.

Fig. 3 is an enlarged elevation party in section on line indicated by $x^3$—$x^3$, Fig. 1.

Fig. 4 is an enlarged fragmental sectional elevation on line indicated by $x^4$—$x^4$, Fig. 3 dotted lines representing the "sprung" position of one of the arms as in Fig. 1.

The trap is provided with arms 1, 2, one crossing the other, connected together at their rear ends by a coil 3. The arm 1 is provided with a right angle bend at 4 forming a cross bar, and the arm 2 extends over the angular portion 4 and is bent at right angles at 5 to form a cross bar slightly in advance of the cross bar 4. The cross bar 5 is shorter than the cross bar 4. The arms 1, 2 extend forward from the cross bars 4, 5 in straight members 6, 7 respectively and at the forward ends of the members 6, 7 the arms are bent upward to form vertical members 8, 9 respectively and said arms thence extend inward toward one another at 10, 11 respectively, said portions 10, 11 terminating in points 12, 13 for impaling the rodent caught in the trap. The coil 3 constitutes a spring for causing the points 12, 13 to be held toward one another and said coil is consequently of spring material. In the instance shown in the drawings the arms 1, 2 and coil 3 are formed of a single piece of material, for example spring steel, spring brass or the like.

The cross bar 4 is provided with a tooth or teeth 14 separated by notches 15. These teeth 14 are designed to hold the arm 2 under tension in various set positions one of which is shown in full lines in Fig. 1. In the instance shown in the drawings the arms 1, 2 are of circular cross section and the portion of the arm 2 crossing the cross bar 4 is more or less angular or wedge-shaped as clearly shown at 16 in Fig. 3 so as to be more readily retained in retracted position by the teeth 14 when the trap is in "set" position.

Journaled at 17 on the cross bar 4 is a release member 18 of semicircular form, the front edge of the member 18 forming an abutment 19 adapted to engage the under side of the arm 2 to raise said arm from engagement with the notch when the member 18 is rotated for that purpose. Rotation of the member 18 is effected, in this instance, by a trigger in the form of a plate 20 and, in the drawings, the plate is integral with the release member 18, in fact in making the trap a single piece of plate material may be provided with a transverse slot 21 through which the arm 2 extends and the lower edge of the plate is bent into a tubular form to make the journals 17 and release member 18, there being a portion of the plate cut away between the journals 17 so as to produce the abutment 19. It is clear that when the arm 2 is in one of the notches 15, pushing of the plate 20 rearward toward the coil 3 will cause the abutment 19 to release the arm 2 which will then be sprung into the dotted position shown in Fig. 1 so as to move its point 13 toward the point 12. The plate 20 is preferably provided with an opening 22 of any suitable shape and size.

In practice, to catch a rodent, for instance a gopher, the trap will be inserted in the hole made by the gopher with the points 12, 13 downward. When the gopher endeavors to come out of the hole he will strike the plate 20 and force the same rearward toward the coil 3 so as to release the arm 2, whereupon the point 13 will spring toward the point 12, impaling the gopher on said points.

The opening 22 allows light to pass through the plate 20 and the gopher, seeing the light, endeavors to enlarge the opening sufficiently to pass out of the hole and in doing this forces the plate 20 rearward so as to allow the trap to be sprung as above described.

I claim:

1. A trap comprising arms, one crossing the other and having inturned ends respectively, means tending to operate one of the arms to move the inturned end thereof toward the inturned end of the other arm, teeth on one of the arms designed to engage the other arm to hold the movable arm retracted against the operating force, and means to release the last named arm from the holding means.

2. A trap comprising arms, one of said arms having a bar extending crosswise of the other arm, a trigger journaled on the cross bar, means to move the forward end of one of the arms toward the other arm, a notch in the cross bar to engage the movable arm to hold the movable arm retracted, and an abutment connected with the trigger and operative thereby to engage the movable arm and force the movable arm out of the notch.

3. A trap comprising arms, one of said arms having a bar extending crosswise of the other arm, a plate journaled on the cross bar and having its lower edge bent to form a semicircular member embracing the cross bar and having a slot, the lower edge of the slot forming an abutment and the last named arm extending through said slot, means to move the forward end of the last named arm toward the other arm, and a notch in the cross bar adapted to engage the arm extending through the slot to hold said arm retracted.

4. A trap comprising arms, one of said arms having a bar extending crosswise of the other arm, means to relatively move the arms toward one another, a notch in the cross bar adapted to engage the other arm to hold said other arm retracted, and a plate having an abutment adapted to be engaged with the last named arm when the plate is moved to release the last named arm from the notch.

Signed at Los Angeles, California, this 6th day of February, 1918.

CHARLES J. ROY.

Witnesses:
GEORGE H. HILES,
L. BELLE WEAVER.